(12) United States Patent
James et al.

(10) Patent No.: US 6,523,108 B1
(45) Date of Patent: Feb. 18, 2003

(54) METHOD OF AND APPARATUS FOR EXTRACTING A STRING OF BITS FROM A BINARY BIT STRING AND DEPOSITING A STRING OF BITS ONTO A BINARY BIT STRING

(75) Inventors: David James, Palo Alto, CA (US); Jung-Jen Liu, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/448,568

(22) Filed: Nov. 23, 1999

(51) Int. Cl.⁷ .......................... G06F 9/315; G06F 9/305
(52) U.S. Cl. ................. 712/224; 712/300; 712/225; 712/210; 710/307; 710/49
(58) Field of Search ................ 712/300, 224, 712/223, 225, 229, 245, 213, 209, 210, 211, 212, 201, 204, 25, 26, 78.9; 345/562, 559; 711/111, 221, 151, 172, 24, 212, 110, 214, 109, 219, 145, 220, 129; 710/126, 20, 29, 52, 33, 53, 34, 307, 49

(56) References Cited

U.S. PATENT DOCUMENTS

| | | | |
|---|---|---|---|
| 3,836,722 A | 9/1974 | Muller et al. ........... 179/15 BS |
| 3,906,484 A | 9/1975 | Melvin, Jr. et al. ... 340/347 DD |
| 4,218,756 A | 8/1980 | Fraser ......................... 364/900 |
| 4,379,294 A | 4/1983 | Sutherland et al. ...... 340/825.5 |
| 4,395,710 A | 7/1983 | Einolf, Jr. et al. ....... 340/825.5 |
| 4,409,656 A | 10/1983 | Andersen et al. ........... 364/200 |
| 4,493,021 A | 1/1985 | Agrawal et al. ............ 364/200 |
| 4,569,016 A | 2/1986 | Hao et al. ................... 364/200 |
| 4,633,392 A | 12/1986 | Vincent et al. ............. 364/200 |
| 4,641,238 A | 2/1987 | Kneib ......................... 364/200 |
| 4,641,307 A | 2/1987 | Russell .......................... 370/60 |
| 4,739,323 A | 4/1988 | Miesterfeld et al. ..... 340/825.5 |
| 4,816,817 A | * 3/1989 | Herrington ................. 345/562 |

(List continued on next page.)

FOREIGN PATENT DOCUMENTS

| | | | |
|---|---|---|---|
| EP | 0 428 111 A2 | 5/1991 | ........... G06F/13/28 |
| EP | 0 499 394 A1 | 8/1992 | ........... G06F/13/38 |
| EP | 0 588 046 A1 | 8/1993 | ........... G06F/13/88 |
| EP | 0 696 853 A2 | 2/1996 | ............ H04B/1/20 |
| EP | 0 715 252 A1 | 6/1996 | ........... G06F/9/308 |

OTHER PUBLICATIONS

Matthias Kaiserswerth, "The Parallel Protocol Engine," IEEE/ACM Transactions on Networking, pp. 650–663, Dec. 1993, No. 6, New York.

(List continued on next page.)

*Primary Examiner*—Daniel H. Pan
(74) *Attorney, Agent, or Firm*—Haverstock & Owens LLP

(57) ABSTRACT

Deposit and extract instructions include an opcode, a source address, a destination address, a shift number, and a K-bit mask string. The opcode describes the operations to be performed upon a J-bit source string and an N-bit destination string. The source address points to the memory location of the J-bit source string. The destination address points to the memory location of the N-bit destination string. The shift number indicates the number of bits the J-bit source string is to be shifted to generate a shifted bit string. The combination of the shifted bit string with the N-bit destination string is conducted under the control of the K-bit mask string. The invention is useful for high speed digital data processing, such as that performed by devices operating under the IEEE 1394 protocol.

28 Claims, 9 Drawing Sheets

U.S. PATENT DOCUMENTS

| | | | |
|---|---|---|---|
| 4,897,783 A | 1/1990 | Nay | 364/200 |
| 4,972,470 A | 11/1990 | Farago | 380/3 |
| 4,998,245 A | 3/1991 | Tanaka et al. | 370/85.1 |
| 5,008,879 A | 4/1991 | Fischer et al. | 370/85.2 |
| 5,117,070 A | 5/1992 | Ueno et al. | 178/2 R |
| 5,191,418 A | 3/1993 | Tran | 358/142 |
| 5,210,839 A | 5/1993 | Powell et al. | 395/400 |
| 5,276,684 A | 1/1994 | Pearson | 370/94.1 |
| 5,325,510 A | 6/1994 | Frazier | 395/425 |
| 5,343,469 A | 8/1994 | Ohshima | 370/85.1 |
| 5,359,713 A | 10/1994 | Moran et al. | 395/200 |
| 5,361,261 A | 11/1994 | Edem et al. | 370/85.3 |
| 5,369,773 A | 11/1994 | Hammerstrom | 395/800 |
| 5,400,340 A | 3/1995 | Hillman et al. | 370/105.3 |
| 5,402,419 A | 3/1995 | Osakabe et al. | 370/85.1 |
| 5,412,698 A | 5/1995 | Van Brunt et al. | 375/373 |
| 5,420,573 A | 5/1995 | Tanaka et al. | 340/825.24 |
| 5,444,709 A | 8/1995 | Riddle | 370/94.1 |
| 5,465,402 A | 11/1995 | Ono et al. | 455/161.2 |
| 5,487,153 A | 1/1996 | Hammerstrom et al. | 395/250 |
| 5,487,159 A | 1/1996 | Byers et al. | 395/375 |
| 5,493,570 A | 2/1996 | Hillman et al. | 370/105.3 |
| 5,497,466 A | 3/1996 | Roden et al. | 395/306 |
| 5,499,344 A | 3/1996 | Elnashar et al. | 395/250 |
| 5,506,846 A | 4/1996 | Edem et al. | 370/94.2 |
| 5,509,126 A | 4/1996 | Oprescu et al. | 395/307 |
| 5,519,701 A | 5/1996 | Colmant et al. | 370/60.1 |
| 5,524,213 A | 6/1996 | Dais et al. | 395/200.17 |
| 5,526,353 A | 6/1996 | Henley et al. | 370/60.1 |
| 5,533,018 A | 7/1996 | DeJager et al. | 370/60.1 |
| 5,535,208 A | 7/1996 | Kawakami et al. | 370/84 |
| 5,537,408 A | 7/1996 | Branstad et al. | 370/79 |
| 5,544,324 A | 8/1996 | Edem et al. | 395/200.17 |
| 5,546,389 A | 8/1996 | Wippenbeck et al. | 370/60 |
| 5,546,553 A | 8/1996 | Robertson et al. | 395/405 |
| 5,548,587 A | 8/1996 | Bailey et al. | 370/60.1 |
| 5,550,802 A | 8/1996 | Worsley et al. | 370/13 |
| 5,559,796 A | 9/1996 | Edem et al. | 370/60 |
| 5,559,967 A | 9/1996 | Oprescu et al. | 395/285 |
| 5,566,174 A | 10/1996 | Sato et al. | 370/84 |
| 5,576,980 A | 11/1996 | Whetsel | 364/579 |
| 5,579,278 A | 11/1996 | McLaury | 365/230.05 |
| 5,586,264 A | 12/1996 | Belknap et al. | 395/200.08 |
| 5,594,732 A | 1/1997 | Bell et al. | 370/401 |
| 5,594,734 A | 1/1997 | Worsley et al. | 370/395 |
| 5,602,853 A | 2/1997 | Ben-Michael et al. | 370/474 |
| 5,603,058 A | 2/1997 | Belknap et al. | 395/855 |
| 5,615,382 A | 3/1997 | Gavin et al. | 395/800 |
| 5,617,419 A | 4/1997 | Christensen et al. | 370/471 |
| 5,619,646 A | 4/1997 | Hoch et al. | 395/200.01 |
| 5,632,016 A | 5/1997 | Hoch et al. | 395/200.02 |
| 5,636,362 A * | 6/1997 | Stone et al. | 711/129 |
| 5,640,392 A | 6/1997 | Hayashi | 370/395 |
| 5,640,592 A | 6/1997 | Rao | 710/5 |
| 5,646,941 A | 7/1997 | Nishimura et al. | 370/389 |
| 5,647,057 A | 7/1997 | Roden et al. | 395/275 |
| 5,652,584 A | 7/1997 | Yoon | 341/89 |
| 5,655,138 A | 8/1997 | Kikinis | 395/808 |
| 5,659,780 A | 8/1997 | Wu | 395/800.19 |
| 5,664,124 A | 9/1997 | Katz et al. | 395/309 |
| 5,668,948 A | 9/1997 | Belknap et al. | 395/200.61 |
| 5,684,954 A | 11/1997 | Kaiserswerth et al. | 395/200.2 |
| 5,687,174 A | 11/1997 | Edem et al. | 370/446 |
| 5,687,316 A | 11/1997 | Graziano et al. | 395/200.2 |
| 5,689,244 A | 11/1997 | Iijima et al. | 340/825.07 |
| 5,689,727 A | 11/1997 | Bonke et al. | 395/840 |
| 5,692,211 A | 11/1997 | Gulick et al. | 395/800 |
| 5,694,555 A | 12/1997 | Morriss et al. | 395/280 |
| 5,696,924 A | 12/1997 | Robertson et al. | 395/412 |
| 5,704,052 A | 12/1997 | Wu et al. | 395/380 |
| 5,706,439 A | 1/1998 | Parker | 395/200.17 |
| 5,708,779 A | 1/1998 | Graziano et al. | 395/200.8 |
| 5,710,773 A | 1/1998 | Shiga | 370/512 |
| 5,752,076 A | 5/1998 | Munson | 395/825 |
| 5,758,075 A | 5/1998 | Graziano et al. | 395/200.8 |
| 5,761,430 A | 6/1998 | Gross et al. | 395/200.55 |
| 5,761,457 A | 6/1998 | Gulick | 395/308 |
| 5,764,939 A | 6/1998 | Caulk, Jr. | 395/381 |
| 5,774,683 A | 6/1998 | Gulick | 395/309 |
| 5,781,599 A | 7/1998 | Shiga | 375/376 |
| 5,787,101 A | 7/1998 | Kelly | 371/49.1 |
| 5,787,256 A | 7/1998 | Marik et al. | 395/200.68 |
| 5,787,298 A | 7/1998 | Broedner et al. | 395/750.05 |
| 5,793,953 A | 8/1998 | Yeung et al. | 395/200.8 |
| 5,799,041 A | 8/1998 | Szkopek et al. | 375/259 |
| 5,812,883 A | 9/1998 | Rao | 395/8.94 |
| 5,815,678 A | 9/1998 | Hoffman et al. | 395/309 |
| 5,828,416 A | 10/1998 | Ryan | 348/512 |
| 5,828,903 A | 10/1998 | Sethuram et al. | 395/817 |
| 5,832,245 A | 11/1998 | Gulick | 395/309 |
| 5,835,726 A | 11/1998 | Shwed et al. | 709/229 |
| 5,835,793 A | 11/1998 | Li et al. | 395/898 |
| 5,848,253 A | 12/1998 | Walsh et al. | 395/309 |
| 5,872,983 A | 2/1999 | Walsh et al. | 395/750.01 |
| 5,875,312 A | 2/1999 | Walsh et al. | 395/309 |
| 5,884,103 A | 3/1999 | Terho et al. | 710/22 |
| 5,887,145 A | 3/1999 | Harari et al. | 395/282 |
| 5,896,518 A | 4/1999 | Yao et al. | 395/384 |
| 5,906,002 A | 5/1999 | Lee | 711/171 |
| 5,938,752 A | 8/1999 | Leung et al. | 710/126 |
| 5,946,298 A | 8/1999 | Okuyama | 370/232 |
| 5,970,236 A | 10/1999 | Galloway et al. | 395/500.44 |
| 5,987,126 A | 11/1999 | Okuyama et al. | 380/5 |
| 5,991,520 A | 11/1999 | Smyers et al. | 395/280 |
| 6,085,270 A | 7/2000 | Gulick | 710/100 |
| 6,167,471 A | 12/2000 | Liu et al. | 710/62 |

OTHER PUBLICATIONS

Michael Tischer, "PC Intern 4 Systemprogrammierung,"pp. 162–181, Data Becker GmbH, 1994, Dusseldorf, Germany.

"The Cable Connection to Complete The Digital Revolution," Impact–IEEE 1394, 21st, The VXM Network, Internet site: vxm.com.

R.H.J. Bloks, "The IEEE–1394 High Speed Serial Bus," Phillips Journal of Research, pp. 209–221, vol. 50, No. 1/2, Jul. 6, 1996.

"IEEE 1394–1995 Triple Cable Transceiver/ Arbiter," Texas Instruments TSB21LV03, Product Preview, Revision 0.99, Mar. 19, 1996.

"1394 200 Mb/s PHYsical Layer Transceiver," IBM Microelectronics Division, Product Data Sheet and Application Notes, Version 1.4, Mar. 14, 1996.

"The SerialSoft IEEE 1394 Developer Toolkit," Toolikit TK–01, Release 2, Skipstone.

"P1394 Standard for a High Performance Serial Bus," Draft 8.0v2, IEEE, Jul. 7, 1995.

"Access to High–Speed LAN via Wireless Media," Software Patent Institute Database of Software Technologies, Apr., 1993.

"Local Area Network Protocol for Autonomous Control of Attached Devices," Software Patent Institute Database of Software Technologies, Jul., 1990.

"Data Exchange Adapter for Micro Channel/370," Software Patent Institute Database of Software Technologies, Oct. 1991.

"Architecture for High Performance Transparent Bridges," Software Patent Institute Database of Software Technologies, Jul., 1992.

Julia L. Heeter, "Asynchronous Transfer Mode," IFSM 651 and 652, Dec. 12, 1995.

Michael Teener, "A Bus on a Diet–The Serial Bus Alternative," Apple Computer, Inc., pp. 316–321, Doc. No. XP 000340753, IEEE, Feb. 24, 1992.

"Selective Register Bit Set/Reset Mechanism," 700 IBM Technical Disclosure Bulletin, pp. 402–405, No. 12, Armonk, NY, May 30, 1988.

A. Anzaloni, et al., "Fiber Channel (FCS)/ATM Interworking: A Design Solution," Ericsson Fatme R&D Division, pp. 1127–1133, Doc. No. XP 000427980, Nov. 29, 1993.

Gee–Swee Poo and Wilson Ang, "Data Link Driver Program Design for the IBM Token Ring Network PC Adapter," Computer Communications, pp. 266–272, No. 5, London, Great Britain, Oct. 12, 1989.

A.S. Krishnakumar, et al., "The Programmable Protocol VLSI Engine (PROVE)," IEEE Transactions on Communications, pp. 2630–2642, No. 8, Aug. 1994, New York.

"Power PC 603: RISC Microprocessor User's Manual," IBM Microelectronics, Power PC, Motorola.

"Precision Architecture and Instruction: Reference Manual," Hewlett Packard Precision Architecture Handbook, Second Edition, Jun., 1987.

"Extended Rotate And Merge Instructions With Built–In Masks," IBM Technical Disclosure Bulletin, Ref. No. XP 000097636, vol. 32, No. 11, Apr., 1990.

* cited by examiner

METHOD OF AND APPARATUS FOR EXTRACTING A STRING OF BITS FROM A BINARY BIT STRING AND DEPOSITING A STRING OF BITS ONTO A BINARY BIT STRING

FIELD OF INVENTION

The present invention relates to the field of computer systems. More particularly, the present invention relates to instructions used to move data within a string from one location to another.

BACKGROUND OF THE INVENTION

The IEEE standard, "IEEE 1394 Standard For A High Performance Serial Bus," Draft ratified in 1995, is an international standard for implementing an inexpensive high-speed serial bus architecture which supports both asynchronous and isochronous format data transfers. Isochronous data transfers are real-time transfers which deliver data on time without guaranteeing the integrity of the data. Each packet of data transferred isochronously is transferred in its own time period. The IEEE 1394-1995 standard bus architecture provides up to sixty-four (64) channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which guarantee the integrity of the data during delivery using an acknowledgement protocol.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. Devices can be added and removed from an IEEE 1394-1995 bus while the bus is active. If a device is so added or removed the bus will then automatically reconfigure itself for transmitting data between the then existing nodes. A node is considered a logical entity with a unique identification number on the bus structure. Each node provides an identification ROM, a standardized set of control registers and its own address space.

The IEEE 1394-1995 standard provides for up to sixty-four different isochronous implementations, certain 1394 devices are being built with the capability to only transmit and receive isochronous data over a subset of less than sixty-four channels. When receiving data on an isochronous channel, that data must be processed by the receiving device. This processing includes any or all of displaying, manipulating, forwarding and storing. Often, data received on different isochronous channels is processed differently, depending on the type of device from which the data is received, the type of data that is received and the desired use of the data. If data received on an isochronous channel is not received and processed efficiently, errors in the display or use of the data can result.

There are a wide variety of computer systems capable of processing digital data. A basic structure of a computer system is shown in FIG. 1A. The heart of the computer system 1 is a central processing unit ("CPU") 2. Within a computer system 1 the CPU 2 is coupled to firmware 4, data storage devices 5, ports 3, and random access memory ("RAM") 6 by a bus structure 7. Data storage devices 5 include hard drives, floppy drives, and CD-ROMs. Input/output ("I/O") devices such as a display monitor 8 and an IEEE 1394-1995 device 10, are coupled to the bus structure 7 through ports 3. A keyboard 9 is also coupled to the CPU 2 through one of the ports 3. Ports 3, both serial or parallel, are used to connect the computer system 1 to modems, printers, and other devices, including other computer systems. FIG. 1B illustrates a computer system 1 coupled to a display monitor 8 and networked to an IEEE 1394-1995 device 10, such as a video camera, through an IEEE 1394-1995 serial cable 11.

In a computer system 1, firmware 4 is used to seek out and load an operating system from one of the data storage devices 5 (usually the hard drive) when the computer system 1 is first turned on. Programs and applications used by the computer system 1 are generally stored on the hard drive and moved at least in part to the RAM 6 during use.

Common CPUs 2 included within a computer system 1 include reduced instruction set computation ("RISC") processors or complex instruction set computation ("CISC") processors. Examples of RISC processors are the PowerPC™ processor manufactured by International Business Machines Corporation and the G3 processor manufactured by Motorola Corporation for Apple Computer Corporation personal computers. Examples of CISC processors are the model 80×86 processor and the Pentium™ processor, which are both available from Intel Corporation of Santa Clara, Calif.

A CPU 2 stores data in internal memory locations, registers, and memory. Registers are used during program execution to temporarily store intermediate results. The advantage of storing data in a register instead of a memory location is that the data within the register can be accessed much faster. Data that is not used during register operation is stored in memory. Memory associated with a processor ("associated memory") is typically located within the CPU 2 itself as L1 cache, nearby the CPU 2 as L2 cache, or in an area separate from the CPU 2.

The location in which data is stored in the registers and memory is identified by an address. A read operation is used to access data found at a specific address. A write operation is used to store data at a specific address. Writing a value to a specific address will erase the value previously found at that address.

Computer systems are controlled by instructions. Instructions are statements specifying an operation to be performed and what data operands are to be processed by the computer system. A queue of pre-selected and sequenced instructions make up each computer program. Each instruction includes an operation code ("opcode") and operands. The opcode is the part of the instruction that identifies the operation to be performed. Typical operations are ADD, SUBTRACT, and MOVE.

Operands describe the data to be processed as the operation specified by the opcode is carried out. The instruction's operands may be an address location or actual data. Placing actual data within the instruction typically results in faster execution of the instruction. Limitation in the instruction's size, however, usually dictates that most operands are address locations for data stored in memory or registers.

A collection of instructions to be used by a particular computer system 1 are referred to as an instruction set. In RISC architectures, the instructions are of uniform length. In x86 CISC processors, the length of instructions varies widely. The minimum instruction consists of a single opcode byte and is 8 bits long. A long instruction that includes a prefix byte is as long as 104 bits. Longer instructions containing more than a single prefix byte are also possible.

One common instruction completed by the CPU 2 is a shift instruction. Shifting is the process of moving data that is stored in a storage device relative to the boundaries of the device, as opposed to moving data in or out of the device. The storage device is often a register designed specifically for shifting ("shift register"). The direction of the shift is either left or right. Vacated bit positions (on the leftmost for shift right operations and on the rightmost for shift left operations) are filled with logical ZEROs. Shift operations are often used in field alignments, packing and unpacking of data items into storage units, and high-speed multiplication and division. Simple shift registers shift data only one space per shift. More advanced shift registers shift data any arbitrary number of spaces per individual shift.

An operation very similar to shifting is rotation. Rotation differs from shifting in that, in a left shift operation, a bit rotated out from the left is placed back into the vacated rightmost bit position. Similarly, in a right shift operation, a bit rotated out from the right is placed back into the vacated leftmost bit position. Otherwise shift and rotate operations are identical.

Another common instruction completed by the CPU 2 is a mask instruction. Masking is used to extract desired information from a storage unit while suppressing the undesired information. In the below example, only the 8 least significant bits of the 16 bit string are extracted from the original register bit string:

01010111 01011100 register bit string
00000000 11111111 mask bit string
00000000 01011100 bit string result As shown, a bitwise logical AND operation is performed with the register bit string and the mask bit string. Where the value of the mask bit is logical ONE, the corresponding register bit is retained in the bit string result. Where the value of the mask bit is logical ZERO, the register bit is suppressed. The mask bit string is generated during the execution of the instruction from data included within the instruction.

A masking operation is used in combination with bit string read operations, shift registers, bitwise logic operations, and bit string write operations to deposit a string of bits into a specific memory or register location. An extract function is a form of a mask operation. For a source bit string S, a destination bit string D, and a mask bit string Mask, an extract function performs a bitwise logical AND operation with the source bit string S and the mask bit string Mask, then places the bit string result into the destination bit string D. In boolean algebra, the equation reads:

D=S AND Mask

A more complex mask operation is the deposit function. In a deposit function, the bits of the destination string D are preserved in the areas masked in the source string S. In boolean algebra, the equation reads:

D=(S AND Mask) OR (D AND ~Mask)

Mask bit strings usually follow predictable patterns. First, the logical ONEs of the mask are typically grouped together. Second, the mask is typically right justified or left justified. Below are examples of 16 bit mask strings.

00000011 11111111 example one
11111111 11000000 example two

Due to their predictable patterns, mask bit strings can be defined in fewer bits than their full length. Defining the mask in fewer bits allows instructions sets to save space within the masking instruction. The cost of saved space, however, is that an additional decoding step is required to generate the mask.

SUMMARY OF THE INVENTION

The method of and apparatus for extracting a string of bits from a binary bit string and depositing a string of bits onto a binary bit string of the present invention is an improved implementation of deposit and extract instructions wherein the instruction contains an opcode, a source address, a destination address, a shift number, and a K-bit mask string. The opcode describes the operations to be performed upon a J-bit source string and an N-bit destination string. The source address points to the register in the CPU or the location of the J-bit source string. The destination address points to the register in the CPU or the location of the N-bit destination string. The shift number indicates the number of bits the J-bit source string will be shifted to generate a shifted bit string. The combination of the shifted bit string with the N-bit destination string is conducted under the control of the K-bit mask string. The method of and apparatus for extracting a string of bits from a binary bit string and depositing a string of bits onto a binary bit string of the present invention is particularly useful for high speed digital data processing, such as that required by IEEE 1394-1995 compliant devices.

An instruction includes an opcode, a source address, a destination address, a shift number, and a mask bit string. The opcode describes the operations to be performed upon a particular source bit string and destination bit string. The operations include an extract left instruction, an extract right instruction, a deposit left instruction, and a deposit right instruction. The source address points to the register in the CPU or the location of the source bit string. The destination address points to the register in the CPU or the location of the destination bit string. The shift number indicates the number of bits the source bit string is to be shifted to generate a shifted bit string. The direction of shift is dictated by the shift value or the opcode. The combination of the shifted bit string with the destination bit string is conducted under the control of a mask bit string. The more specific implementations of the present invention are the extract and deposit instructions.

The deposit instruction also begins with an instruction comprising an opcode, a source address, a destination address, a shift value, and a K-bit mask bit string. The CPU first reads a J-bit source string located at the source address and an N-bit destination string located at the destination address. The CPU shifts the J-bit source string as determined by the shift number and the opcode to obtain a shifted bit string. The CPU then combines the shifted bit string and the N-bit destination string under control of the K-bit mask string to obtain an N-bit final string, such that: (i) individual bits of the shifted bit string are included in the N-bit final string where the corresponding individual bits of the K-bit mask string have a value equal to logical ONE; and individual bits of the N-bit destination string are included in the N-bit final string where the corresponding individual bits of the K-bit mask string have a value equal to logical ZERO. In a final step, the CPU writes the N-bit final string to the destination address.

There are three additional implementations of the deposit instruction. In the first additional implementation, the numeric values of J, K, and N are equal. In the second additional implementation, the combination step is performed by the following steps: (i) performing a logical AND operation of the shifted bit string and the K-bit mask string to obtain a first bit string; (ii) performing a logical AND operation of the N-bit destination string and the logical complement of the K-bit mask string to obtain a second bit string; and (iii) performing a logical OR operation of the first bit string and the second bit string to obtain the N-bit final string. In the third additional implementation, the processing steps are performed by an embedded stream processor and the registers within the embedded stream processor contain the source address and the destination address.

Like the deposit instruction, the extract instruction begins with an instruction comprising an opcode, a source address, a destination address, a shift number, and a K-bit mask string. The CPU or equivalent means first reads a J-bit source string located at the source address. The CPU shifts the J-bit source string as determined by the shift number and the opcode to obtain a shifted bit string. The CPU then combines the shifted bit string and the K-bit mask string to obtain an N-bit final string, such that: (i) individual bits of the shifted bit string are included in the N-bit final string where the corresponding individual bits of the K-bit mask string have a value of logical ONE; and (ii) remaining individual bits of the N-bit final string have a value of logical ZERO. In a final step, the CPU writes the N-bit final string to the destination address.

There are three additional implementations of the extract instruction. In the first additional implementation, the numeric values of J, K, and N are equal. In the second additional implementation, the combination step is accomplished by performing a bitwise logical AND operation with the shifted bit string and the K-bit mask string. In the third additional implementation, the processing steps are performed by an embedded stream processor and the registers within the embedded stream processor contain the source address and the destination address.

DETAILED DESCRIPTION OF THE PREFERRED EMBODIMENT

The method of and apparatus for extracting a string of bits from a binary bit string and depositing a string of bits onto a binary bit string of the present invention preferably include the mask bit string within the deposit and extract instructions, thereby eliminating a mask generation step during the execution of the instruction.

FIGS. 2A through 2E illustrate possible combinations of a source bit string, from which a string of bits is extracted, and a destination bit string, to which a string of bits is deposited. The section L within the source bit string represents the bits selected for extraction. The section M within the destination bit string represents the bits to be replaced by the section L bits extracted from the source bit string. The bits designated by "s" in the source bit string represent bits that are removed by masking during an extract instruction. The bits designated by "d" in the destination bit string represent bits that are either zeroed out if the operands are subjected to an extract instruction or that will remain if the operands are subjected to a deposit instruction. The designation "X" represents the number of bits to the right of the section L in the source bit string. The designation "Y" represents the number of bits to the right of the section M in the destination bit string.

Figure 1A:
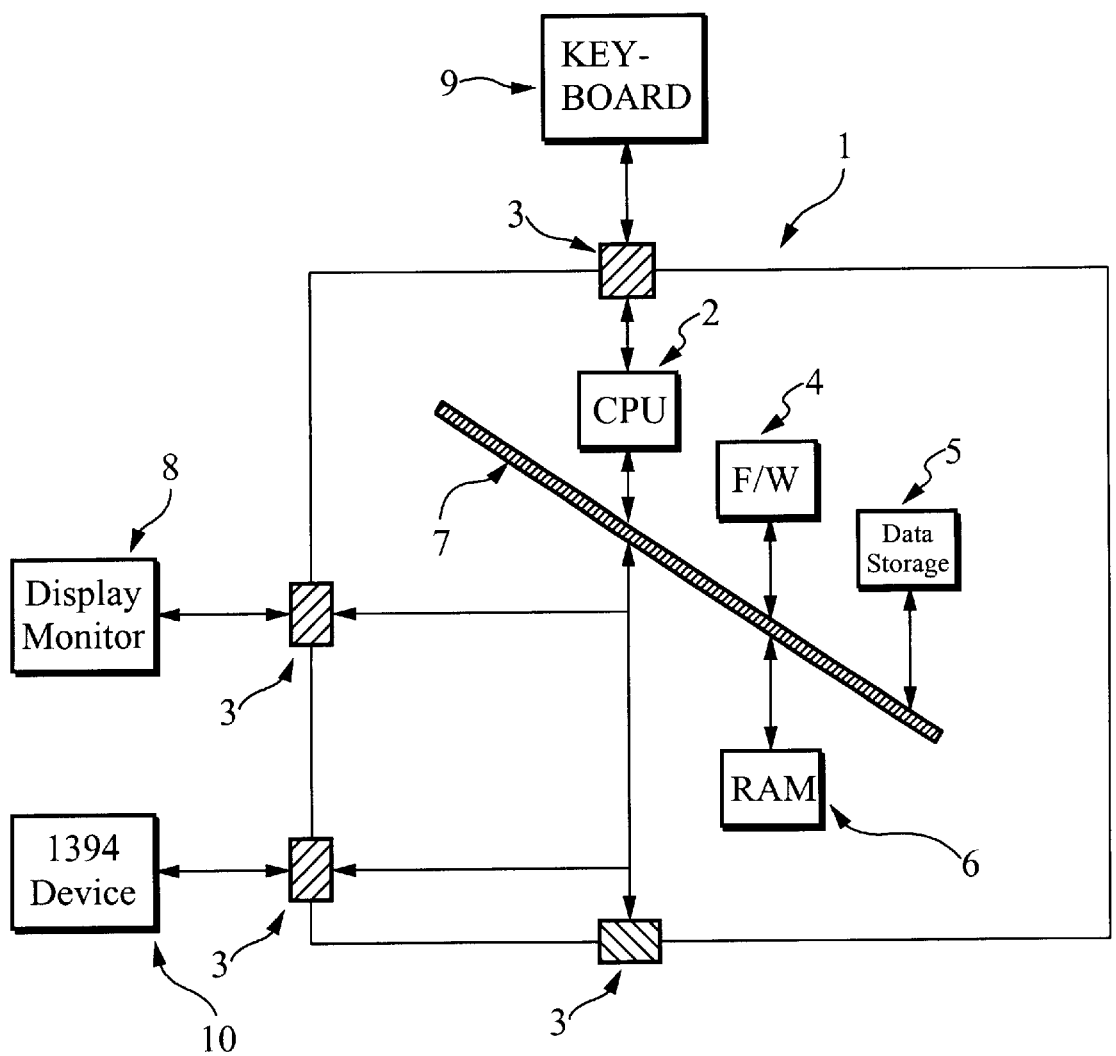
FIG. 1A illustrates a block diagram showing the basic components of an exemplary computer system.
Figure 1B:
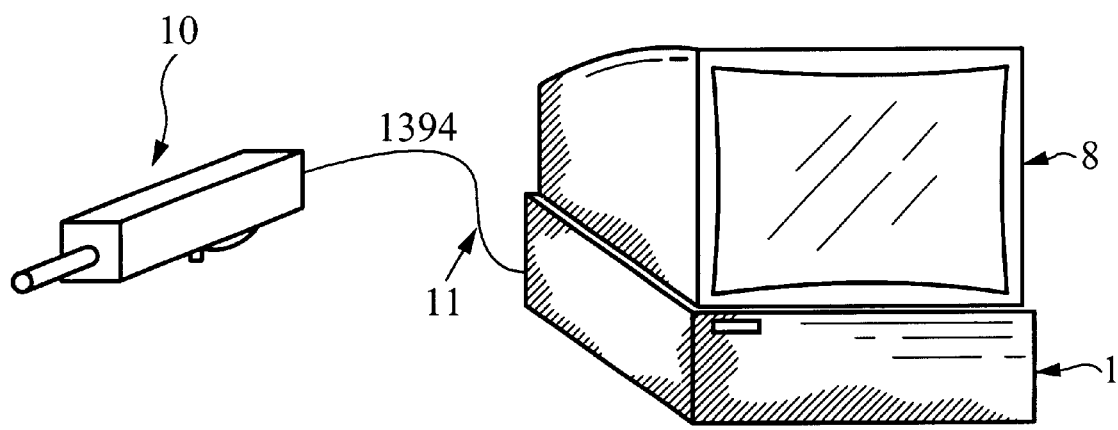
FIG. 1B shows a computer system networked to an IEEE 1394-1995 device through an IEEE 1394-1995 serial cable.
Figure 2D:
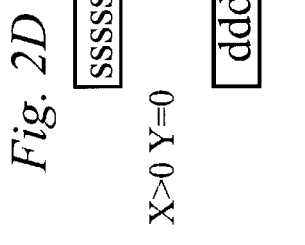
FIGS. 2A through 2E show different combinations of source bit strings and destination bit strings.
Figure 2E:
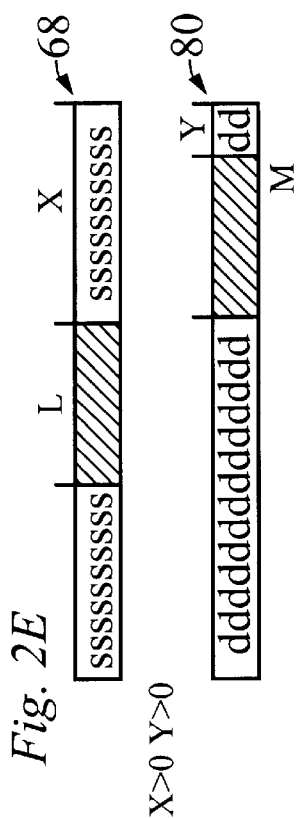
Figure 2A:
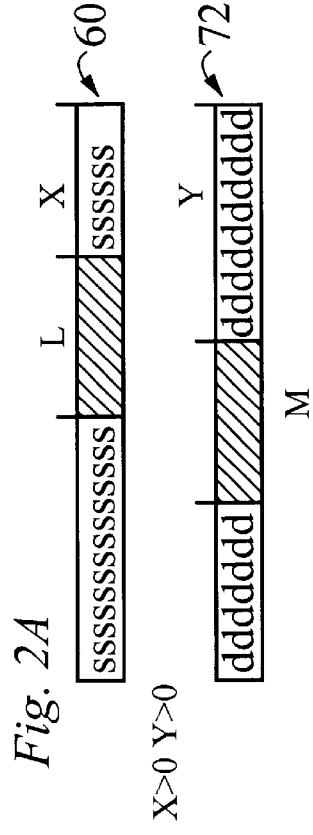
Figure 2B:
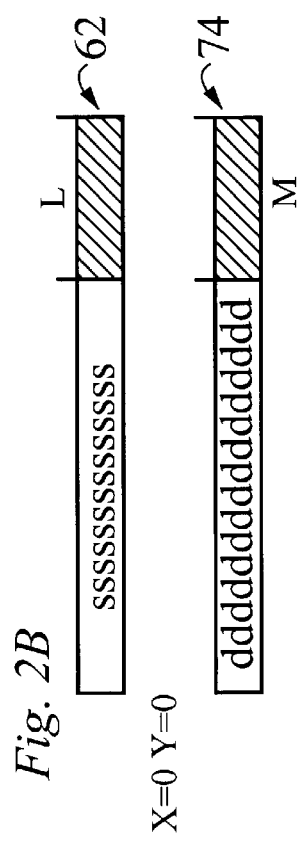
Figure 2C:
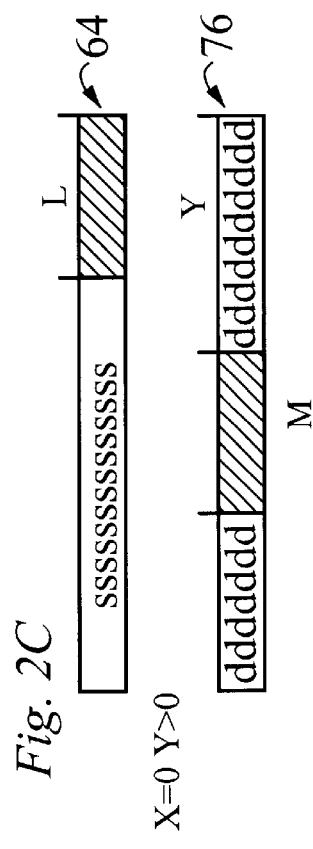

In the source and destination bit strings illustrated in FIG. 2A, the value of X in the source bit string 60 and the value of Y in the destination bit string 72 are both greater than zero. In this example, the value of Y is also greater than the value of X. In the source and destination bit strings illustrated in FIG. 2B, the value of X in the source bit string 62 and the value of Y in the destination bit string 74 are both equal to zero. In the source and destination bit strings illustrated in FIG. 2C, the value of X in the source bit string 64 is equal to zero and the value of Y in the destination bit string 76 is greater than zero. In the source and destination bit strings illustrated in FIG. 2D, the value of X in the source bit string 66 is greater than zero and the value of Y in the destination bit string 78 is equal to zero. In the source and destination bit strings illustrated in FIG. 2E, the value of X in the source bit string 68 and the value of Y in the destination bit string 80 are both greater than zero. In this example, the value of X is also greater than the value of Y.

The direction of the shifting step in an extract or deposit instruction is determined by the relative positions of the section L in the source bit string and the section M in the destination bit string. As an example, in FIGS. 2A and 2C, the section M is located to the left of the section L. To move the bits within the section L to the location within the section M, a shift left step must be performed. Similarly, in FIGS. 2D and 2E, the section M is located to the right of the section L and a shift right step must be performed to move the bits within the section L to the location within the section M. Because section M and section L are both right justified in the example of FIG. 2B, no shifting is required.

Within the preferred embodiment of the present invention, the direction of the shifting step is contained in the opcode. Extract left and deposit right instructions shift the bits within the section L to the left. Extract right and deposit right instructions shift the bits within the section L to the right.

The magnitude of each shift operation is determined by the difference between the X and Y values. In the preferred embodiment, the shift value is the absolute value of the difference between the X and Y values. In an alternative embodiment, the shift value is a signed number and the sign of the shift value determines the shift direction.

Figure 3:
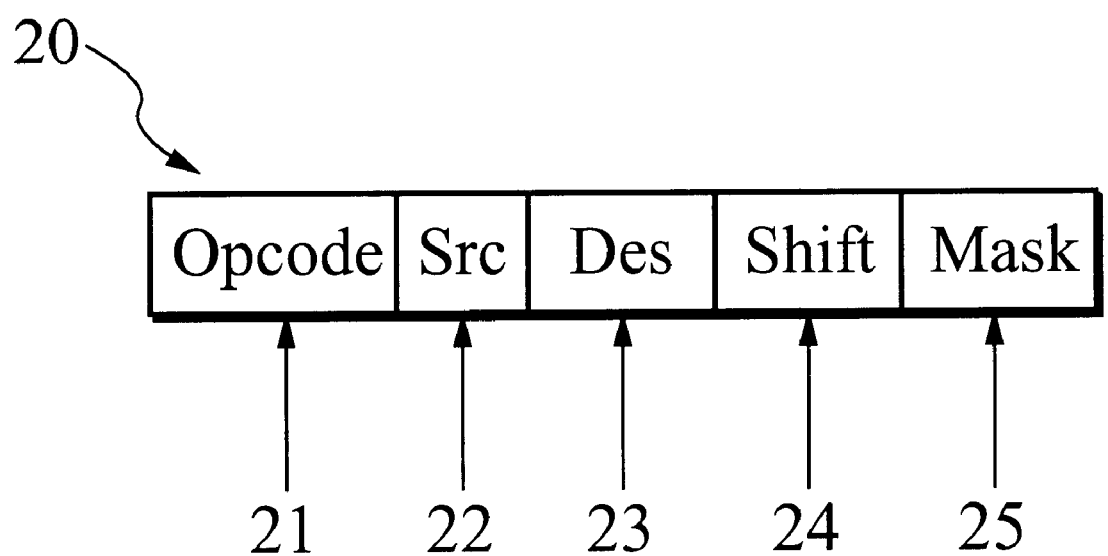
FIG. 3 shows a format of the deposit and extract instructions according to the preferred embodiment of the present invention.

The instruction format of the preferred embodiment is illustrated in FIG. 3. The instruction 20 is preferably 64 bits wide. The preferred format of the instruction 20 is set forth below in Table I.

TABLE I

Instruction Format

| Element | MSB | LSB | Description | Bit | Reference # |
|---|---|---|---|---|---|
| Opcode | 63 | 58 | operation code | 6 | 21 |
| Src | 57 | 50 | source address | 8 | 22 |
| Des | 49 | 42 | destination address | 8 | 23 |
| Shift | 41 | 36 | shift value | 6 | 24 |
| — | 35 | 34 | reserved for future use | 2 | |
| Mask | 33 | 0 | mask bit string | 34 | 25 |

The opcode 21 is located within the six most significant bits of the instruction 20 and informs the processor which operation is to be performed. The source address 22 is located within the next eight most significant bits and specifies the location for the source bit string. The destination address 23 is located within the next eight most significant bits and specifies the location of the destination bit string. The shift value 24 is located within the next six most significant bits and represents the number of bits the source bit string must be shifted to properly place the section L of the source bit string into the section M of the destination bit string. The shift value 24 is not an address. The mask bit string 25 is located within the thirty-four least significant bits of the instruction 20 and is similar to the source bit string and the destination bit string in that it contains 34 bits and the two most significant bits are flag bits. The flag bits indicate first whether the value in the source address 22 is a data packet header and second whether there is another packet that will be sent that is related to the present packet. Unlike the source bit string and the destination bit string, the mask bit string 25 is located within the instruction 20. Like the shift value 24, the mask bit string 25 is generated prior to the execution of the instruction 20. In alternative embodiments of the instruction 20, the length of the source bit string, the destination bit string, and the mask bit string 25 can be of different lengths.

In the preferred embodiment, the direction of the shift operation is dictated by the opcode 21. The extract left instruction, for example, has a different opcode 21 than the extract right instruction. In an alternative embodiment, the shift direction is included in the shift value 24. In this alternative embodiment, the difference between a left shift versus a right shift is encoded in the shift value 24 by use of a flag bit or use of signed numbers.

Figure 4:
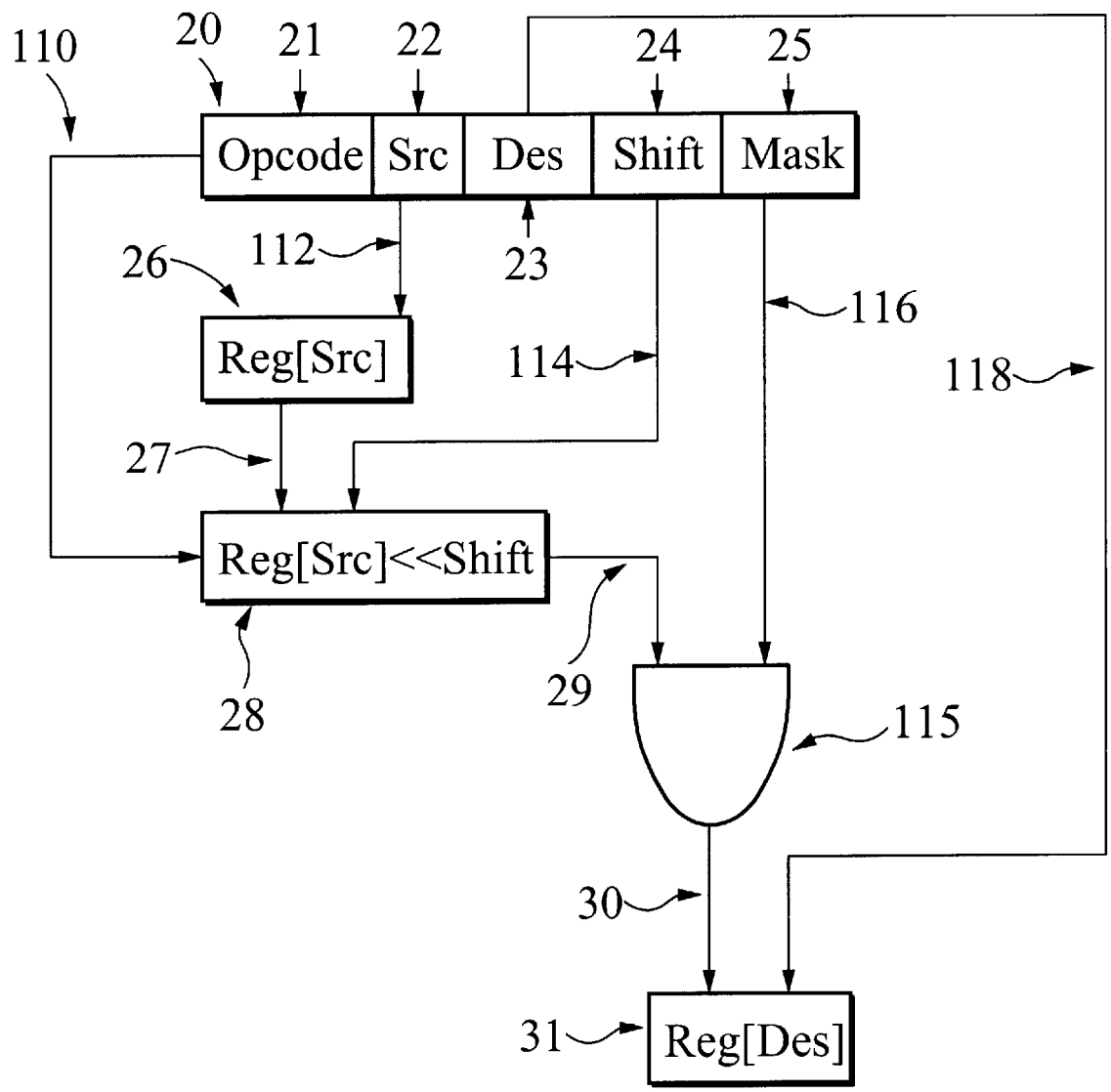
FIG. 4 shows a block diagram of a circuit for completing an extract left instruction according to the preferred embodiment of the present invention.

A block diagram of a circuit for implementing an extract left instruction is illustrated in FIG. 4. In this implementation, an extract left source address 112 from the instruction 20 is loaded into a source register 26. A J-bit source string 27 located at the extract left source address is then loaded into a shift register 28 from the source register 26. An extract left shift value 114 from the instruction 20 and an extract left opcode 110 from the instruction 20 are also loaded into the shift register 28. Taking the left shift direction from the extract left opcode 110 and the amount of shift from the extract left shift value 114, the shift register 28 then produces a shifted bit string 29. This shifted bit string 29 is then provided as an input to a logical AND gate 115. An extract left K-bit mask string 116 from the instruction 20 is also provided as an input to the logical AND gate 115. The logical AND gate 115 performs a logical AND operation on the shifted bit string 29 and the K-bit mask string 116 and provides an N-bit final string 30 as an output. The N-bit final string 30 is provided from the logical AND gate 115 to the destination register 31. A destination register 31 writes the N-bit final string 30 to an extract left destination address 118 dictated by the instruction 20.

Figure 5:
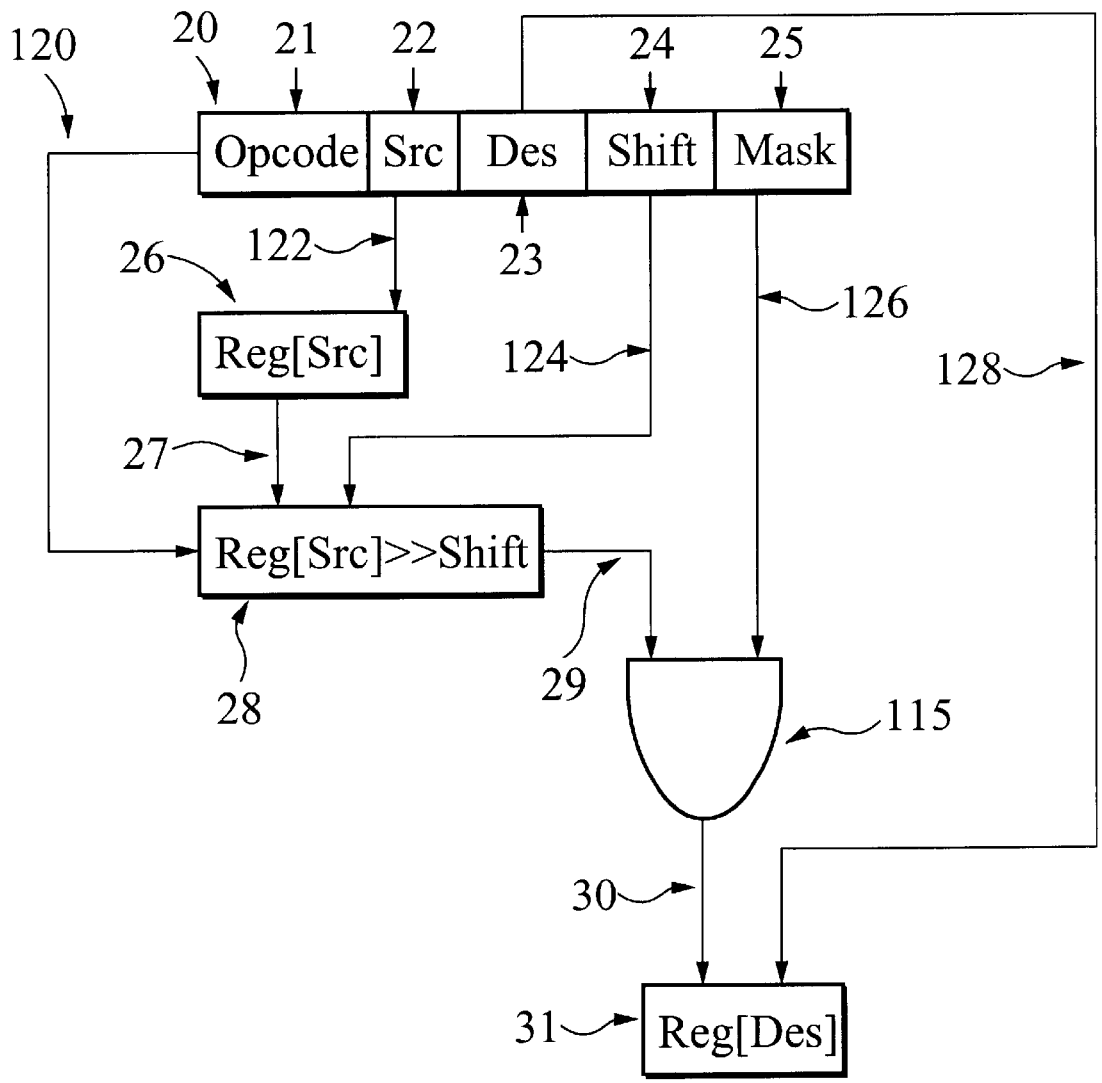
FIG. 5 shows a block diagram of a circuit for completing an extract right instruction according to the preferred embodiment of the present invention.

A block diagram of a circuit for implementing an extract right instruction is illustrated in FIG. 5. In this implementation, an extract right source address 122 from the instruction 20 is loaded into the source register 26. A J-bit source string 27 located at the extract right source address 122 is then loaded into a shift register 28 from the source register 26. An extract right shift value 124 from the instruction 20 and an extract right opcode 120 from the instruction 20 are also loaded into the shift register 28. Taking the right shift direction from the extract right opcode and the amount of shift from the extract right shift value 124, the shift register 28 then produces a shifted bit string 29. This shifted bit string 29 is then provided as an input to the logical AND gate 115. An extract right K-bit mask string 126 from the instruction 20 is also provided as an input to the logical AND gate 115. The logical AND gate 115 performs a logical AND operation on the shifted bit string 29 and the K-bit mask string 126 and provides an N-bit final string 30 as an output. The N-bit final string 30 is provided from the logical AND gate 115 to the destination register 31. The destination register 31 writes the N-bit final string 30 to an extract right destination address 128 dictated by the instruction 20.

Figure 6:
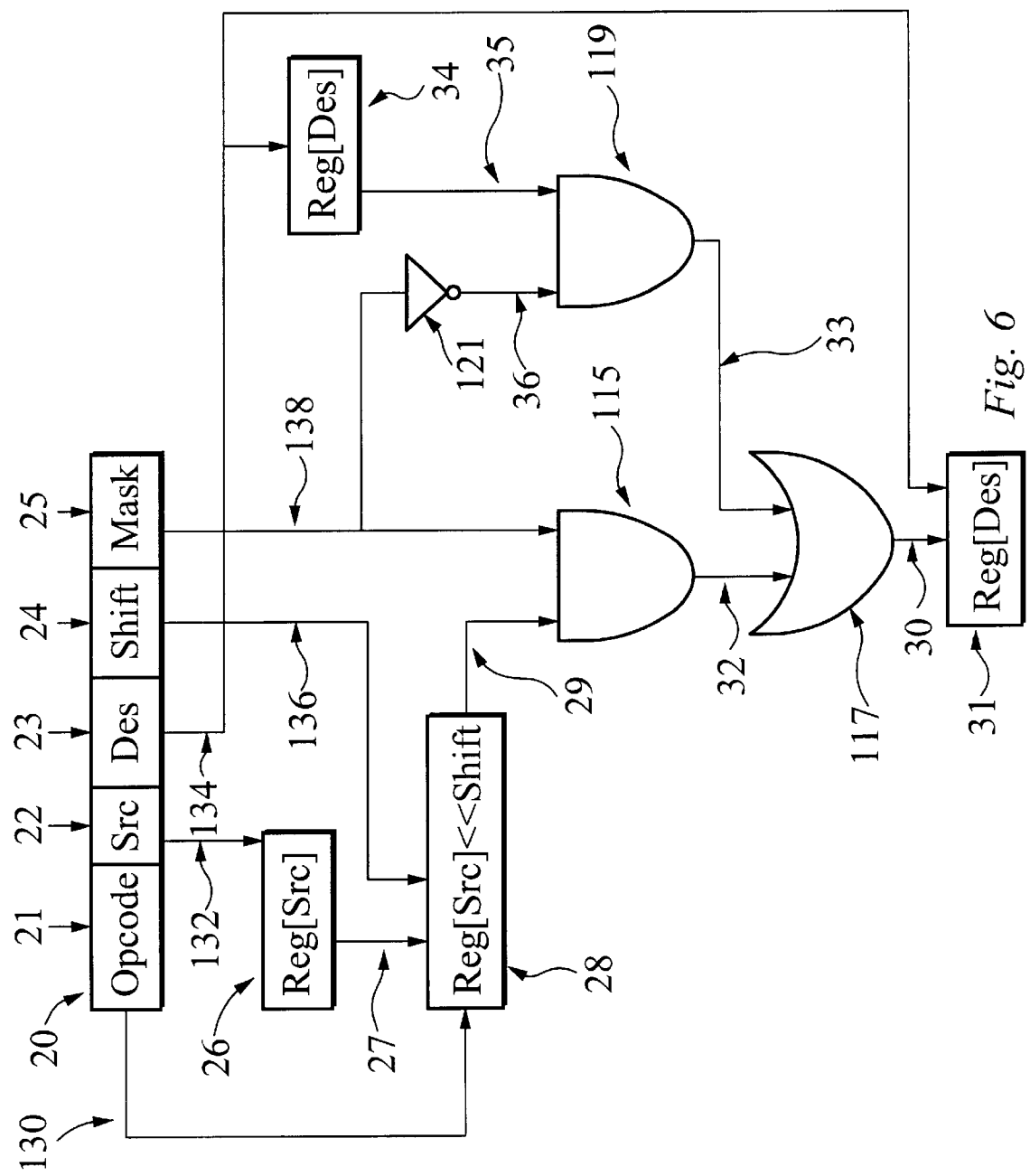
FIG. 6 shows a block diagram of a circuit for completing a deposit left instruction according to the preferred embodiment of the present invention.

A block diagram of a circuit for implementing a deposit left instruction is illustrated in FIG. 6. In this implementation, a deposit left source address 132 from the instruction 20 is loaded into the source register 26. A J-bit source string 27 located at the deposit left source address 132 is then loaded into a shift register 28 from the source register 26. A deposit left shift value 136 and deposit left opcode 130 from the instruction 20 are also loaded into the shift register 28. Taking the left shift direction from the deposit left opcode 130 and the amount of shift from the deposit left shift value 136, the shift register 28 then produces a shifted bit string 29. This shifted bit string 29 is then provided as an input to the logical AND gate 115. A deposit left K-bit mask string 138 from the instruction 20 is also provided as an input to the logical AND gate 115. The logical AND gate 115 performs a logical AND operation on the shifted bit string 29 and the K-bit mask string 138 and provides a first bit string 32 as an output. The first bit string 32 is provided from the logical AND gate 115 as an input to the logical OR gate 117. A deposit left destination address 134 from the instruction 20 is loaded into a destination register 34 and a destination register 31. The destination register 34 receives the deposit left destination address 134 from the instruction 20 and reads the N-bit destination string 35 located at the deposit left destination address 134. The N-bit destination string 35 is provided as an input to a logical AND gate 119. The deposit left K-bit mask string 138 from the instruction 20 is provided as an input to an inverter circuit 121. The inverter circuit 121 inverts the bits within the deposit left K-bit mask string 138. The bitwise complement 36 of the deposit left K-bit mask string 138 is provided as an output from the inverter circuit 121 to the logical AND gate 119 as an input. The logical AND gate 119 performs a logical AND operation on the N-bit destination string 35 and the bitwise complement 36 and provides a second bit string 33 as an output. The second bit string 33 is provided from the logical AND gate 119 as an input to the logical OR gate 117. The logical OR gate 117 performs a logical OR operation on the first bit string 32 and the second bit string 33 and provides an N-bit final string 30 as an output. The N-bit final string 30 is provided from the logical OR gate 117 to the destination register 31. The destination register 31 writes the N-bit final string 30 to a deposit left destination address 134 dictated by the instruction 20.

Figure 7:
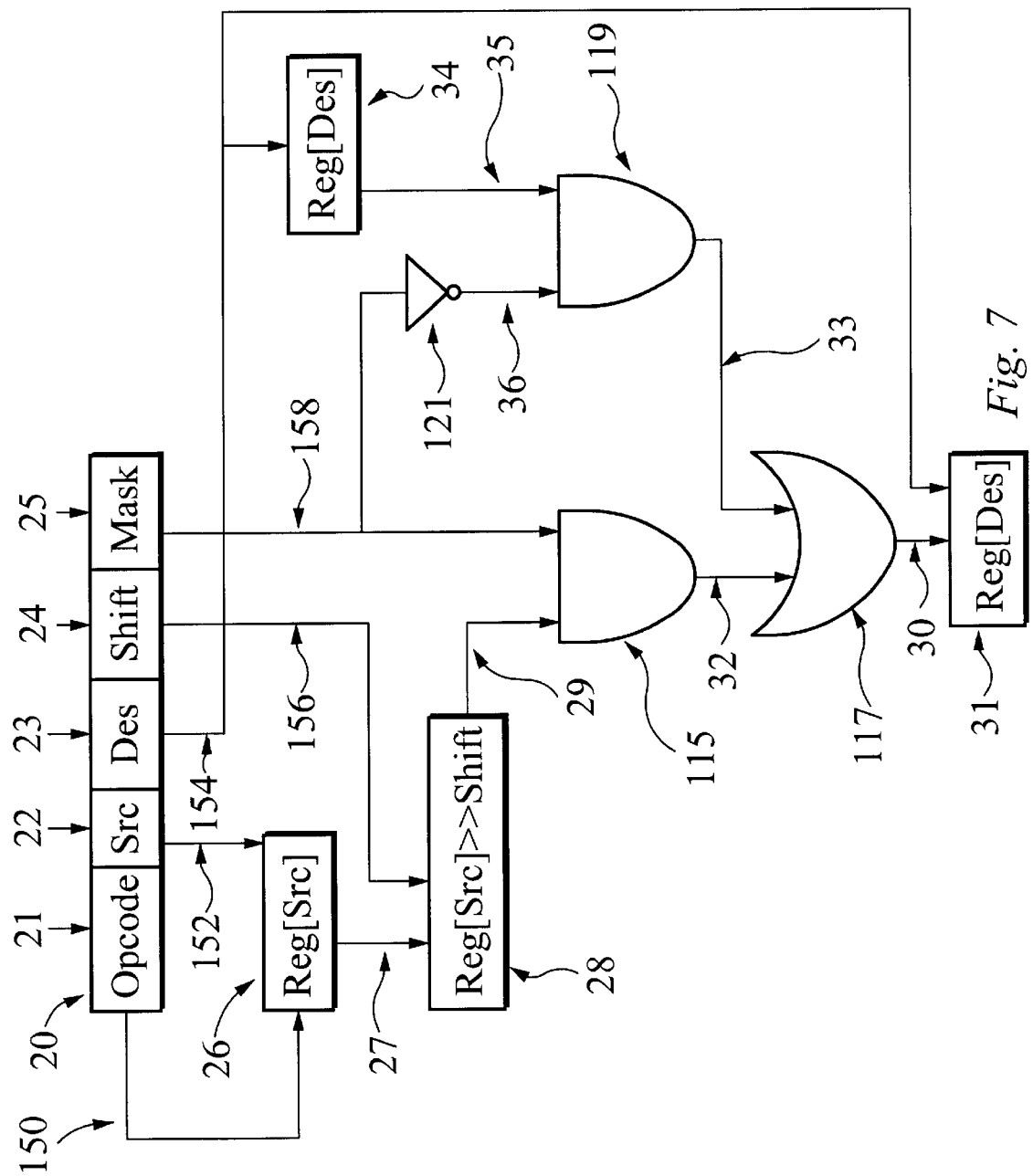
FIG. 7 shows a block diagram of a circuit for completing a deposit right instruction.

A block diagram of a circuit for implementing a deposit right instruction is illustrated in FIG. 7. In this implementation, a deposit right source address 152 from the instruction 20 is loaded into the source register 26. A J-bit source string 27 located at the deposit right source address 152 is then loaded into a shift register 28 from the source register 26. A deposit right shift value 156 and deposit right opcode 150 from the instruction 20 are also loaded into the shift register 28. Taking the right shift direction from the deposit right opcode 150 and the amount of shift from the deposit right shift value 156, the shift register 28 then produces a shifted bit string 29. This shifted bit string 29 is then provided as an input to the logical AND gate 115. A deposit right K-bit mask string 158 from the instruction is also provided as an input to the logical AND gate 115. The logical AND gate 115 performs a logical AND operation on the shifted bit string 29 and the K-bit mask string 158 and provides a first bit string 32 as an output. The first bit string 32 is provided from the logical AND gate 115 as an input to a logical OR gate 117.

A deposit right destination address 154 from the instruction 20 is loaded into the destination register 34 and a destination register 31. The destination register 34 receives the deposit right destination address 154 from the instruction 20 and reads the N-bit destination string 35 located at the deposit right destination address 154. The N-bit destination string 35 is provided as an input to a logical AND gate 119. The deposit right K-bit mask string 158 from the instruction 20 is provided as an input to an inverter circuit 121. The inverter circuit 121 inverts the bits within the deposit right K-bit mask string 158. The bitwise complement 36 of the deposit right K-bit mask string 158 is provided as an output from the inverter circuit 121 to the logical AND gate 119 as an input. The logical AND gate 119 performs a logical AND operation on the N-bit destination string 35 and the bitwise complement 36 and provides a second bit string 33 as an output. The second bit string 33 is provided from the logical AND gate 119 as an input to the logical OR gate 117. The logical OR gate 117 performs a logical OR operation on the first bit string 32 and the second bit string 33 and provides an N-bit final string 30 as an output. The N-bit final string 30 is provided from the logical OR gate 117 to the destination register 31. The destination register 31 writes the N-bit final string 30 to a deposit right destination address 154 dictated by the instruction 20.

In the deposit and extract instructions of the present invention, the length of the J-bit source string 27, the K-bit mask string 25, and the N-bit destination string 35 is often the same length. The 34 bit length is used in the preferred embodiment described in Table I because many video packets have 32 bit headers and 2 flag bits. The flag bits indicate whether additional packets exist and whether the 32 bits are header information or data.

Figure 8:
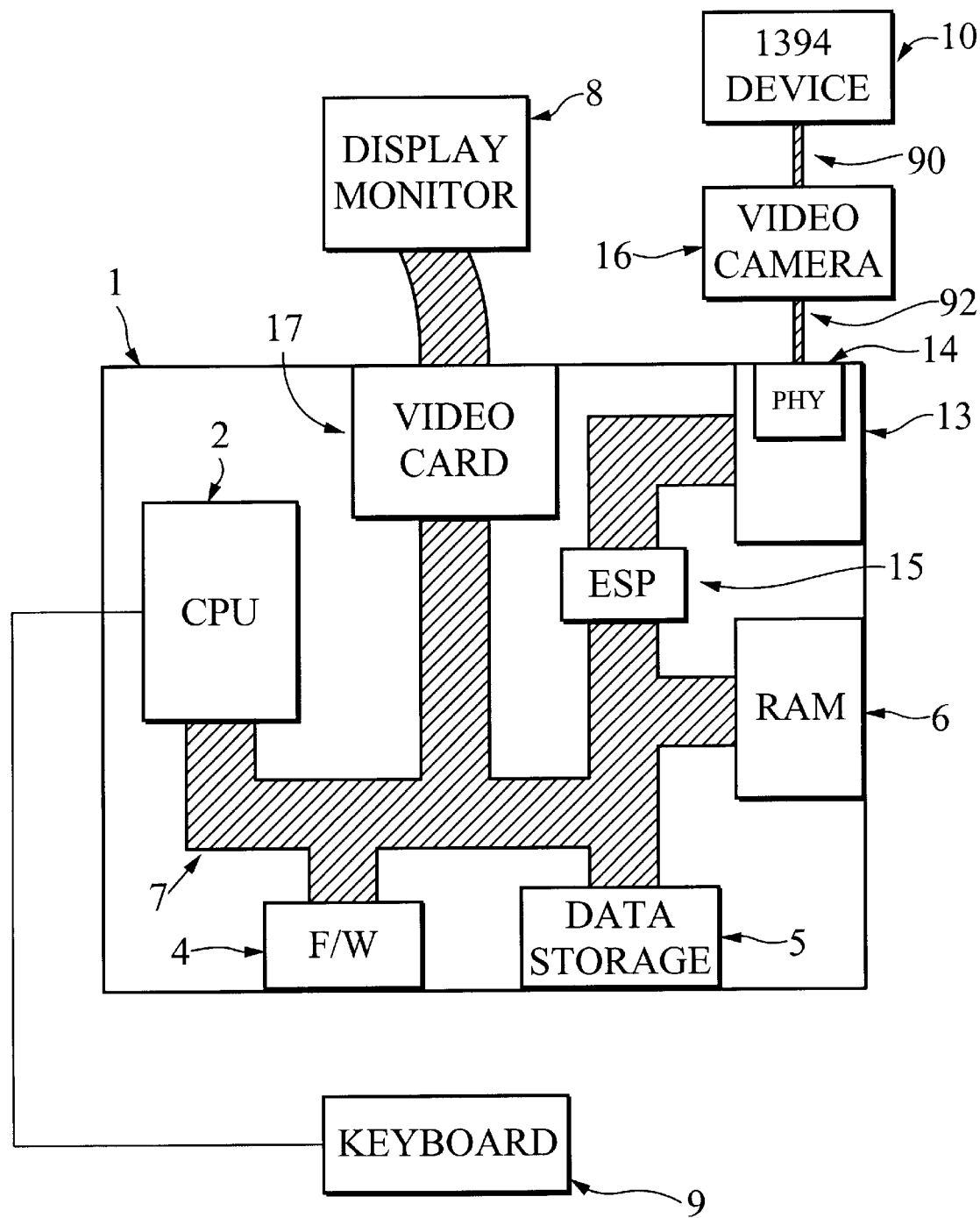
FIG. 8 illustrates a block diagram showing the basic components of an exemplary computer system with an IEEE 1394-1995 interface circuit and attached IEEE 1394-1995 devices.

Deposit and extract instructions can be executed by the CPU 2 of a computer system 1 or by an embedded stream processor. Use of an embedded stream processor within a computer system 1 is illustrated in FIG. 8. FIG. 8 shows a computer system 1 that includes a CPU 2, firmware 4, data storage 5, RAM 6, a video card 17, an embedded stream processor 15, and an IEEE 1394-1995 interface circuit 13, all of which are intercoupled by a bus structure 7. A display monitor 8 is coupled to the video card 17. A keyboard 9 is coupled to the CPU 2. The embedded stream processor 15 is coupled to the bus structure 7 and the IEEE 1394-1995 interface circuit 13. The IEEE 1394-1995 interface circuit 13 is coupled to a video camera 16 by an IEEE 1394-1995 serial bus cable 92. The video camera 16 is coupled to a second IEEE 1394-1995 device 10 by a second IEEE 1394-1995 serial bus cable 90.

The preferred embodiment of the embedded stream processor 15 is taught within U.S. patent application Ser. No. 08/612,322, filed on Mar. 7, 1996, and entitled *"Isochronous Data Pipe for Managing and Manipulating a High-Speed Stream of Isochronous Data Flowing Between an Application and a Bus Structure"* which is hereby incorporated by reference. The embedded stream processor 15 is programmable and will execute a series of instructions on a stream of data in order to perform operations and manipulations on the data as required to place the data in the appropriate format. Within the present invention, the embedded stream processor 15 is tasked with converting digital data from one application format to another. Digital data is generally transferred in data packets over the IEEE 1394-1995 serial bus. The data packets contain both header and data fields. The header provides information such as the size and format of the data packet. Using the extract instructions of the present invention, the embedded stream processor 15 selectively captures and modifies appropriate header and data bits. The captured header and data bits are then provided to appropriate locations using the deposit instructions of the present invention.

The present invention has been described in terms of specific embodiments incorporating details to facilitate the understanding of principles of construction and operation of the invention. References to specific embodiments and details of the invention are not intended to limit the scope of the appended claims. It will be apparent to those skilled in the art that modifications may be made in the illustrated embodiment without departing from the spirit and scope of the invention. Specifically, it will be apparent to those skilled in the art that while the preferred embodiment of the present invention is used with an IEEE 1394-1995 serial bus structure, the present invention could also be implemented on any other appropriate systems or bus structures, including other or later versions of the IEEE 1395 serial bus.

We claim:

1. A method of placing a string of bits onto a binary bit string comprising the steps of:

a. reading an instruction comprising an opcode, a source address, a destination address, a shift number, and a K-bit mask string;

b. reading a J-bit source string located at the source address;

c. reading an N-bit destination string located at the destination address;

d. shifting the J-bit source string as determined by the shift number and the opcode to obtain a shifted bit string;

e. combining the shifted bit string and the N-bit destination string under control of the K-bit mask string to obtain an N-bit final string wherein individual bits of the shifted bit string are included in the N-bit final string where the corresponding individual bits of the K-bit mask string have a first logical value and individual bits of the N-bit destination string are included in the N-bit final string where the corresponding individual bits of the K-bit mask string have a is second logical value; and f. writing the N-bit final string to the destination address.

2. The method of placing a string of bits onto a binary bit string as claimed in claim 1 wherein numeric values of J, K, and N are equal.

3. The method of placing a string of bits onto a binary bit string as claimed in claim 1 wherein the step of combining the shifted bit string and the N-bit destination string to obtain the N-bit final string is performed by completing the following steps:
  a. performing a bitwise logical AND operation with the shifted bit string and the K-bit mask string to obtain a first bit string;
  b. performing a bitwise logical AND operation with the N-bit destination string and the logical complement of the K-bit mask string to obtain a second bit string; and
  c. performing a bitwise logical OR operation with the first bit string and the second bit string.

4. The method of placing a string of bits onto a binary bit string as claimed in claim 1 wherein the steps are performed by an embedded stream processor.

5. The method of placing a string of bits onto a binary bit string as claimed in claim 1 wherein the first logical value is equal to a logical ONE and the second logical value is equal to a logical ZERO.

6. A method of placing a string of bits onto a binary bit string comprising the steps of:
  a. reading an instruction comprising an opcode, a source address, a destination address, a shift number, and a K-bit mask string;
  b. reading a J-bit source string located at the source address;
  c. shifting the J-bit source string as determined by the shift number and the opcode to obtain a shifted bit string;
  d. combining the shifted bit string and the K-bit mask string to obtain an N-bit final string, wherein individual bits of the shifted bit string are included in the N-bit final string where the corresponding individual bits of the K-bit mask string have a first logical value and remaining individual bits of the N-bit final string have a second logical value; and
  e. writing the N-bit final string to the destination address.

7. The method of placing a string of bits onto a binary bit string as claimed in claim 6 wherein numeric values of J, K, and N are equal.

8. The method of placing a string of bits onto a binary bit string as claimed in claim 6 wherein the step of combining the shifted bit string and K-bit mask string to obtain the N-bit final string is completed by performing a bitwise logical AND operation with the shifted bit string and the K-bit mask string.

9. The method of placing a string of bits onto a binary bit string as claimed in claim 6 wherein the steps are completed by performing an embedded stream processor.

10. The method of placing a string of bits onto a binary bit string as claimed in claim 6 wherein the first logical value is equal to a logical ONE and the second logical value is equal to a logical ZERO.

11. An apparatus for placing a string of bits onto a binary bit string comprising:
  a. means for reading an instruction, wherein the instruction includes an opcode specifying a direction of shift operation, a source address at which a J-bit source string is located, a destination address at which an N-bit destination string is located, a shift value specifying a number of bits of the shift operation, and a K-bit mask string;
  b. means for shifting coupled to the means for reading and configured for shifting the J-bit source string the number of bits specified by the shift value and the direction specified by the opcode to produce a shifted bit string;
  c. means for combining coupled to the means for reading and to the means for shifting and configured for combining the shifted bit string and the N-bit destination string under control of the K-bit mask string to obtain an N-bit final string wherein individual bits of the shifted bit string are included in the N-bit final string where the corresponding individual bits of the K-bit mask string have a first logical value and individual bits of the N-bit destination string are included in the N-bit final string where the corresponding individual bits of the K-bit mask string have a second logical value; and
  d. means for writing, coupled to the means for reading, the means for shifting, and to the means for combining and configured for writing the N-bit final string to the destination address.

12. The apparatus as claimed in claim 11 wherein numeric values of J, K, and N are equal.

13. The apparatus as claimed in claim 11 wherein the means for combining further comprises:
  a. a first logical AND gate coupled to receive the shifted bit string and the K-bit mask string for performing a bitwise logical AND operation with the shifted bit string and the K-bit mask string to obtain an N-bit first string;
  b. a second logical AND gate coupled to receive the N-bit destination string and a logical complement of the K-bit mask string for performing a bitwise logical AND operation with the N-bit destination string and the logical complement of the K-bit mask string to obtain an N-bit second string; and
  c. a logical OR gate coupled to receive the N-bit first string and the N-bit second string for performing a bitwise logical OR operation with the first bit string and the N-bit second string to obtain the N-bit final string.

14. An apparatus for placing a string of bits onto a binary bit string comprising:
  a. means for reading an instruction, wherein the instruction includes an opcode specifying a direction of shift operation, a source address at which a J-bit source string is located, a destination address at which an N-bit destination string is located, a shift value specifying a number of bits of the shift operation, and a K-bit mask string;
  b. means for shifting coupled to the means for reading and configured for shifting the J-bit source string the number of bits specified by the shift value and the direction specified by the opcode to produce a shifted bit string;
  c. means for combining coupled to the means for reading and to the means for shifting and configured for combining the shifted bit string and the N-bit destination string under control of the K-bit mask string to obtain an N-bit final string wherein individual bits of the shifted bit string are included in the N-bit final string where the corresponding individual bits of the K-bit mask string have a first logical value and remaining individual bits of the N-bit final string have a second logical value; and
  d. means for writing, coupled to the means for reading, the means for shifting, and to the means for combining and configured for writing the N-bit final string to the destination address.

15. The apparatus as claimed in claim 14 wherein numeric values of J, K, and N are equal.

16. The apparatus as claimed in claim 14 wherein the means for combining further comprises a logical AND gate coupled to receive the shifted bit string and the K-bit mask string for performing a bitwise logical AND operation with the shifted bit string and the K-bit mask string to obtain the N-bit final string.

17. An apparatus for placing a string of bits onto a binary bit string comprising:
  a. a reading circuit configured to access an opcode located within an instruction wherein the opcode specifies a direction of a shift operation, a J-bit source string located at a source address contained in the instruction, an N-bit destination string located at a destination address contained in the instruction, a shift value located within the instruction, wherein the shift value specifies a number of bits of the shift operation, and a K-bit mask string located within the instruction;
  b. a shifting register coupled to the reading circuit and configured to shift the J-bit source string the number of bits specified by the shift value and the direction specified by the opcode to produce a shifted bit string;
  c. a combining circuit coupled to the reading circuit and to the shift register and configured to combine the shifted bit string and the N-bit destination string under control of the K-bit mask string to obtain an N-bit final string wherein individual bits of the shifted bit string are included in the N-bit final string where the corresponding individual bits of the K-bit mask string have a first logical value and individual bits of the N-bit destination string are included in the N-bit final string where the corresponding individual bits of the K-bit mask string have a second logical value; and
  d. a writing circuit coupled to the reading circuit, the shift register and to the combining circuit and configured to write the N-bit final string to the destination address.

18. The apparatus as claimed in claim 17 wherein numeric values of J, K, and N are equal.

19. The apparatus as claimed in claim 17 wherein the combining circuit further comprises:
  a. a first logical AND gate coupled to receive the shifted bit string and the K-bit mask string for performing a bitwise logical AND operation upon the shifted bit string and the K-bit mask string to obtain an N-bit first string;
  b. a second logical AND gate coupled to receive the N-bit destination string and a logical complement of the K-bit mask string for performing a bitwise logical AND operation upon the N-bit destination string and the logical complement of K-bit mask string to obtain an N-bit second string; and
  c. a logical OR gate coupled to receive the N-bit first string and the N-bit second string for performing a bitwise logical OR operation with the first bit string and the N-bit second string to obtain the N-bit final string.

20. An apparatus for placing a string of bits onto a binary bit string comprising:
  a. a reading circuit configured to access an opcode located within an instruction, wherein the opcode specifies a direction of a shift operation, a J-bit source string located at a source address located within the instruction, an N-bit destination string located at a destination address located within the instruction, a shift value located within the instruction, wherein the shift value specifies a number of bits of the shift operation, and a K-bit mask string located within the instruction;
  b. a shift register coupled to the reading circuit and configured to shift the J-bit source string the number of bits specified by the shift value and the direction specified by the opcode to produce a shifted bit string;
  c. a combining circuit coupled to the reading circuit and to the shift register and configured to combine the shifted bit string and the K-bit mask string to obtain an N-bit final string wherein individual bits of the shifted bit string are included in the N-bit final string where the corresponding individual bits of the K-bit mask string have a first logical value and remaining individual bits of the N-bit final string have a second logical value; and
  d. a writing circuit coupled to the reading circuit, the shift register, and to the combining circuit, and configured to write the N-bit final string to the destination address.

21. The apparatus as claimed in claim 20 wherein numeric values of J, K, and N are equal.

22. The apparatus as claimed in claim 20 wherein the combining circuit includes an AND gate performing a bitwise logical AND operation upon the shifted bit string and the K-bit mask string.

23. A computer system configured for coupling to a network of devices to transmit and receive data comprising:
  a. an interface circuit to transmit data to and receive data from the network of devices; and
  b. an embedded stream processor coupled to the interface circuit to process data directed to and from the interface circuit, including:
    i) a reading circuit configured to access an opcode located within an instruction wherein the opcode specifies a direction of a shift operation, a J-bit source string located at a source address contained in the instruction, an N-bit destination string located at a destination address contained in the instruction, a shift value located within the instruction, wherein the shift value specifies a number of bits of the shift operation, and a K-bit mask string located within the instruction;
    ii) a shift register coupled to the reading circuit and configured to shift the J-bit source string the number of bits specified by the shift value and the direction specified by the opcode to produce a shifted bit string;
    iii) a combining circuit coupled to the reading circuit and to the shift register and configured to combine the shifted bit string and the N-bit destination string under control of the K-bit mask string to obtain an N-bit final string wherein individual bits of the shifted bit string are included in the N-bit final string where the corresponding individual bits of the K-bit mask string have a first logical value and individual bits of the N-bit destination string are included in the N-bit final string where the corresponding individual bits of the K-bit mask string have a second logical value; and
    iv) a writing circuit coupled to the reading circuit, the shift register and to the combining circuit and configured to write the N-bit final string to the destination address.

24. The computer system as claimed in claim 23 wherein numeric values of J, K, and N are equal.

25. The computer system as claimed in claim 23 wherein the combining circuit further comprises:
  a. a first logical AND gate coupled to receive the shifted bit string and the K-bit mask string for performing a bitwise logical AND operation upon the shifted bit string and the K-bit mask string to obtain an N-bit first string;
  b. a second logical AND gate coupled to receive the N-bit destination string and a logical complement of the K-bit mask string for performing a bitwise logical AND operation upon the N-bit destination string and the logical complement of the K-bit mask string to obtain an N-bit second string; and c. a logical OR gate coupled to receive the N-bit first string and the N-bit second string for performing a bitwise logical OR operation with the first bit string and the N-bit second string to obtain the N-bit final string.

26. A computer system configured for coupling to a network of devices to transmit and receive data comprising:

a. an interface circuit to transmit data to and receive data from the network of devices;

b. an embedded stream processor coupled to the interface circuit to process data directed to and from the interface circuit, including:

i) a reading circuit configured to access an opcode located within an instruction, wherein the opcode specifies a direction of a shift operation, a J-bit source string located at a source address located within the instruction, a destination address located within the instruction, a shift value located within the instruction, wherein the shift value specifies a number of bits of the shift operation, and a K-bit mask string located within the instruction;

ii) a shift register coupled to the reading circuit and configured to shift the J-bit source string the number of bits specified by the shift value and the direction specified by the opcode to produce a shifted bit string;

iii) a combining circuit coupled to the reading circuit and the shift register and configured to combine the shifted bit string and the K-bit mask string to obtain an N-bit final string wherein individual bits of the shifted bit string are included in the N-bit final string where the corresponding individual bits of the K-bit mask string have a first logical value and remaining individual bits of the N-bit final string have a second logical value; and iv) a writing circuit coupled to the reading circuit, the shift register, and to the combining circuit, and configured to write the N-bit final string to the destination address.

27. The computer system as claimed in claim 26 wherein numeric values of J, K, and N are equal.

28. The computer system as claimed in claim 26 wherein the combining circuit includes an AND gate performing a bitwise logical AND operation upon the shifted bit string and the K-bit mask string.

\* \* \* \* \*